US011315281B2

(12) United States Patent
Sun et al.

(10) Patent No.: US 11,315,281 B2
(45) Date of Patent: Apr. 26, 2022

(54) PUPIL POSITIONING METHOD AND APPARATUS, VR/AR APPARATUS AND COMPUTER READABLE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiankang Sun, Beijing (CN); Hao Zhang, Beijing (CN); Lili Chen, Beijing (CN); Hongzhen Xue, Beijing (CN); Fuqiang Ma, Beijing (CN); Minglei Chu, Beijing (CN); Xi Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 25 days.

(21) Appl. No.: 16/956,747

(22) PCT Filed: Nov. 19, 2019

(86) PCT No.: PCT/CN2019/119422
§ 371 (c)(1),
(2) Date: Jun. 22, 2020

(87) PCT Pub. No.: WO2020/155792
PCT Pub. Date: Aug. 6, 2020

(65) Prior Publication Data
US 2021/0241487 A1 Aug. 5, 2021

(30) Foreign Application Priority Data
Jan. 31, 2019 (CN) .......................... 201910109960.4

(51) Int. Cl.
G06T 7/73 (2017.01)
G06T 7/136 (2017.01)
(Continued)

(52) U.S. Cl.
CPC ................. *G06T 7/73* (2017.01); *G06F 3/013* (2013.01); *G06K 9/0061* (2013.01); *G06T 7/13* (2017.01);
(Continued)

(58) Field of Classification Search
CPC .. G06T 7/73; G06T 7/136; G06T 7/13; G06T 7/60; G06T 2207/10048;
(Continued)

(56) References Cited

U.S. PATENT DOCUMENTS 10,417,495 B1 * 9/2019 Davami .................... G06T 7/75
2003/0053663 A1 3/2003 Chen et al.
2019/0121427 A1 * 4/2019 Qin ......................... G06F 3/013

FOREIGN PATENT DOCUMENTS

CN 103067662 A 4/2013
CN 103761519 A 4/2014
(Continued)

OTHER PUBLICATIONS

Li et al. "Starburst: A Hybrid Algorithm for Video-Based Eye Tracking Combining Feature-Based and Model-Based Approaches." IEEE Computer Society Conference on Computer Vision and pattern Recognition, Sep. 21, 2005, 8 pages (Year: 2005).*
(Continued)

Primary Examiner — Jon Chang
(74) Attorney, Agent, or Firm — WHDA, LLP

(57) ABSTRACT

The present disclosure relates to a pupil positioning method. The pupil positioning method may include: obtaining an eye image under illumination of a light source; determining a first internal point in a pupil of the eye image; calculating
(Continued)

gradient changes of pixel points along a straight line starting from the first internal point toward outside of the pupil; determining a plurality of edge points at an edge of the pupil based on the gradient changes of the pixel points along the straight line; and performing ellipse fitting on the edge points to obtain a pupil center.

17 Claims, 8 Drawing Sheets

(51) Int. Cl.
*G06T 7/13* (2017.01)
*G06T 7/60* (2017.01)
*G06F 3/01* (2006.01)
*H04N 5/225* (2006.01)
*G06K 9/00* (2022.01)

(52) U.S. Cl.
CPC ............... *G06T 7/136* (2017.01); *G06T 7/60* (2013.01); *H04N 5/2256* (2013.01); *G06K 9/00604* (2013.01); *G06T 2207/10048* (2013.01); *G06T 2207/30041* (2013.01); *G06T 2207/30201* (2013.01)

(58) Field of Classification Search
CPC ........... G06T 2207/30201; G06T 2207/30041; G06K 9/6206; G06K 9/0061; G06K 9/00604; G06K 9/00597; G06F 3/013; H04N 5/2256

See application file for complete search history.

(56) References Cited

FOREIGN PATENT DOCUMENTS

| CN | 104809458 A | 7/2015 |
|----|----|----|
| CN | 107977622 A | 5/2018 |
| CN | 108229392 A | 6/2018 |
| CN | 108509873 A | 9/2018 |
| CN | 108509908 A | 9/2018 |
| CN | 109857254 A | 6/2019 |
| WO | 2016090376 A1 | 6/2016 |

OTHER PUBLICATIONS

Zhao et al. "An Effective and Rapid Localization Algorithm of Pupil Center based on Starburst Model." IEEE Advanced Information Management, Communicates, Electronic and Automation Control Conference, Oct. 3, 2016, pp. 988-991 (Year: 2016).*

Office Action dated Dec. 27, 2019, issued in counterpart CN Application No. 201910109960.4, with English translation (19 pages).

International Search Report dated Feb. 7, 2020, issued in counterpart Application No. PCT/CN2019/119422 (10 pages).

* cited by examiner

PUPIL POSITIONING METHOD AND APPARATUS, VR/AR APPARATUS AND COMPUTER READABLE MEDIUM

CROSS-REFERENCE TO RELATED APPLICATIONS

This application claims benefit of the filing date of Chinese Patent Application No. 201910109960.4 filed on Jan. 31, 2019, the disclosure of which is hereby incorporated in its entirety by reference.

TECHNICAL FIELD

The present disclosure relates to the field of human-computer interaction, and in particular, to a pupil positioning method, a pupil positioning apparatus, a VR/AR apparatus, and a computer readable medium.

BACKGROUND

In recent years, with the development of science and technology, human-computer interaction based on eye tracking has gained important applications in virtual reality (VR) and augmented reality (AR) interactions due to its convenience and efficiency. The eyeball tracking technology utilizes a calibration process to obtain a mapping matrix from a pupil to a fixation point by analyzing pupil movement of the human eye, thereby achieving the purpose of interaction with a computer or VR using the line of sight. However, the resolution of the camera capturing the movement of the human eye is usually low, but the resolution of the display device used to achieve the interaction is high. The small error of the pupil positioning may cause a large error in the position of the fixation point. Therefore, high precision and high stabilization of the pupil positioning plays an important role in improving eye tracking.

BRIEF SUMMARY

One embodiment of the present disclosure is a pupil positioning method. The method may include:
obtaining an eye image under illumination of a light source;
determining a first internal point in a pupil of the eye image;
calculating gradient changes of pixel points along a straight line starting from the first internal point toward outside of the pupil;
determining a plurality of edge points at an edge of the pupil based on the gradient changes of the pixel points along the straight line; and
performing ellipse fitting on the edge points to obtain a pupil center.

Optionally, determining the first internal point in the pupil of the eye image may include:
obtaining imaging points of the light source on a cornea and calculating an average centroid position of all the imaging points in the eye image;
obtaining a pupil scan area based on the average centroid position;
scanning the eye image in the pupil scan area using a pupil scan frame having a predetermined side length according to a predetermined scan step size; and
determining a center of the pupil scan frame having a smallest average gray value as the first internal point.

Optionally, the pupil scan frame may have a side length of d/4 and a scan step size of d/2, a value of d may be $1/16$ of a width of the eye image or a length of a long axis of a pupil ellipse calculated based on a previous frame of the eye image.

Optionally, determining the plurality of edge points at the edge of the pupil based on the gradient changes of the pixel points along the straight line may include:
determining a pixel point, among the pixel points along the straight line, having a gradient change that satisfies a preset condition as a first edge point at the edge of the pupil;
searching for a plurality of pixel points in the image having the same or similar gradient change as the gradient change at the first edge point, and
setting the plurality of pixel points as the second edge point to the Nth edge point, where N is a positive integer greater than 4.

Optionally, the gradient change may be a change in a pixel gray value, and the preset condition may be that the change in the pixel gray value at the pixel point is not less than a preset edge gradient.

Optionally, searching for the plurality of pixel points in the image having the same or similar gradient change as the gradient change at the first edge point may include:
searching, starting from the first edge point, in neighborhood pixels along a predetermined direction for a first point that a difference between a gradient change at the first point and the gradient change at the first edge point is less than a predetermined threshold, and setting the first point as the second edge point;
searching, starting from the second edge point, in neighborhood pixels along the predetermined direction for a second point that a difference between a gradient change at the second point and the gradient change at the first edge point is less than the predetermined threshold, and setting the second point as the third edge point; and
repeating the above steps until the Nth edge point is obtained.

Optionally, performing ellipse fitting on the edge points may include:
dividing the edge points from the first edge point to the Nth edge point into a plurality of consecutive groups;
performing ellipse fitting on the edge points in each of the consecutive groups separately to obtain a plurality of ellipses;
obtaining intersection points of the plurality of ellipses; and
obtaining the pupil center based on the intersection points.

Optionally, each of the plurality of consecutive groups may include a substantially same number of edge points.

Optionally, dividing the edge points from the first edge point to the Nth edge point into the plurality of consecutive groups may include:
dividing the edge points from the first edge point to the Nth edge point into four groups in horizontal and vertical directions; or
dividing the edge points from the first edge point to the Nth edge point into four groups in a clockwise or counter-clockwise direction.

Optionally, obtaining the pupil center based on the intersection points may include:
using average values of coordinates of the intersection points as position coordinates of the pupil center.

Optionally, the light source may be an infrared light-emitting diode (LED) lamp and a wavelength of an infrared light from the infrared LED lamp may be about 850 nm.

Optionally, the eye image may be captured by an infrared camera.

Optionally, the method, before determining the first internal point in the pupil of the eye image, may further include preprocessing the eye image including gray value conversion, histogram equalization, and Gaussian filtering.

Another embodiment of the present disclosure is a pupil positioning apparatus. The apparatus may include:

an image acquisition processor, configured to obtain an eye image under illumination of a light source;

an internal point determination processor, configured to obtain a first internal point in a pupil of the eye image;

a calculation processor, configured to calculate gradient changes of pixel points along a straight line starting from the first internal point toward outside of the pupil;

a first edge point determination processor, configured to determine a pixel point having a gradient change that satisfies a preset condition as a first edge point at an edge of the pupil;

a search processor, configured to search for a plurality of pixel points in the eye image having the same or similar gradient change as the gradient change at the first edge point, and set the plurality of pixel points as a second edge point to an Nth edge point, where N is a positive integer greater than 4; and a fitting processor, configured to perform ellipse fitting on the edge points from the first edge point to the Nth edge point to obtain a pupil center.

Optionally, the internal point determination unit may include:

a centroid determination subprocessor, configured to obtain imaging points of the light source on a cornea and calculate an average centroid position of all the imaging points in the eye image;

a scan subprocessor, configured to obtain a pupil scan area based on the average centroid position and scan the eye image in the pupil scan area using a pupil scan frame having a predetermined side length based on a predetermined scan step size; and an internal point determination subprocessor, configured to determine a center of the pupil scan frame having a smallest average gray value as the first internal point.

Optionally, the fitting processor may include:

a grouping subprocessor, configured to divide the edge points from the first edge point to the Nth edge point into consecutive groups;

an ellipse fitting subprocessor, configured to perform ellipse fitting on the edge points in each of the groups separately to obtain a plurality of ellipses;

a pupil positioning subprocessor, configured to obtain intersection points of the plurality of ellipses and obtain the pupil center using the intersection points.

Another embodiment of the present disclosure is a virtual reality/augmented reality apparatus. The virtual reality/augmented reality apparatus may include the pupil positioning apparatus.

Another embodiment of the present disclosure is a computer storage medium. The computer storage medium may have stored thereon computer program instructions, wherein the pupil positioning method is implemented when the computer program instructions are executed by a processor.

Another embodiment is a pupil positioning apparatus. The pupil positioning apparatus may include a display screen, a processor, and a storage medium coupled to the processor and storing a computer program that, when executed by the processor, causes the processor to:

obtain an eye image under illumination of a light source;

determine a first internal point in a pupil of the eye image;

calculate gradient changes of pixel points along a straight line starting from the first internal point toward outside of the pupil;

determine a plurality of edge points at an edge of the pupil based on the gradient changes of the pixel points along the straight line; and perform ellipse fitting on the edge points to obtain a pupil center.

Optionally, the computer program, when executed by the processor, causes the processor to determine the first internal point in the pupil of the eye image comprises causing the processor to:

obtain imaging points of the light source on a cornea and calculating an average centroid position of all the imaging points in the eye image;

obtain a pupil scan area based on the average centroid position;

scan the eye image in the pupil scan area using a pupil scan frame having a predetermined side length according to a predetermined scan step size; and determine a center of the pupil scan frame having a smallest average gray value as the first internal point.

BRIEF DESCRIPTION OF THE DRAWINGS

The drawings are intended to provide a further understanding of the technical solutions of the present disclosure, and are intended to be a part of the specification, and are used to explain the technical solutions of the present disclosure, and do not constitute a limitation of the technical solutions of the present disclosure.

DETAILED DESCRIPTION

Figure 1:
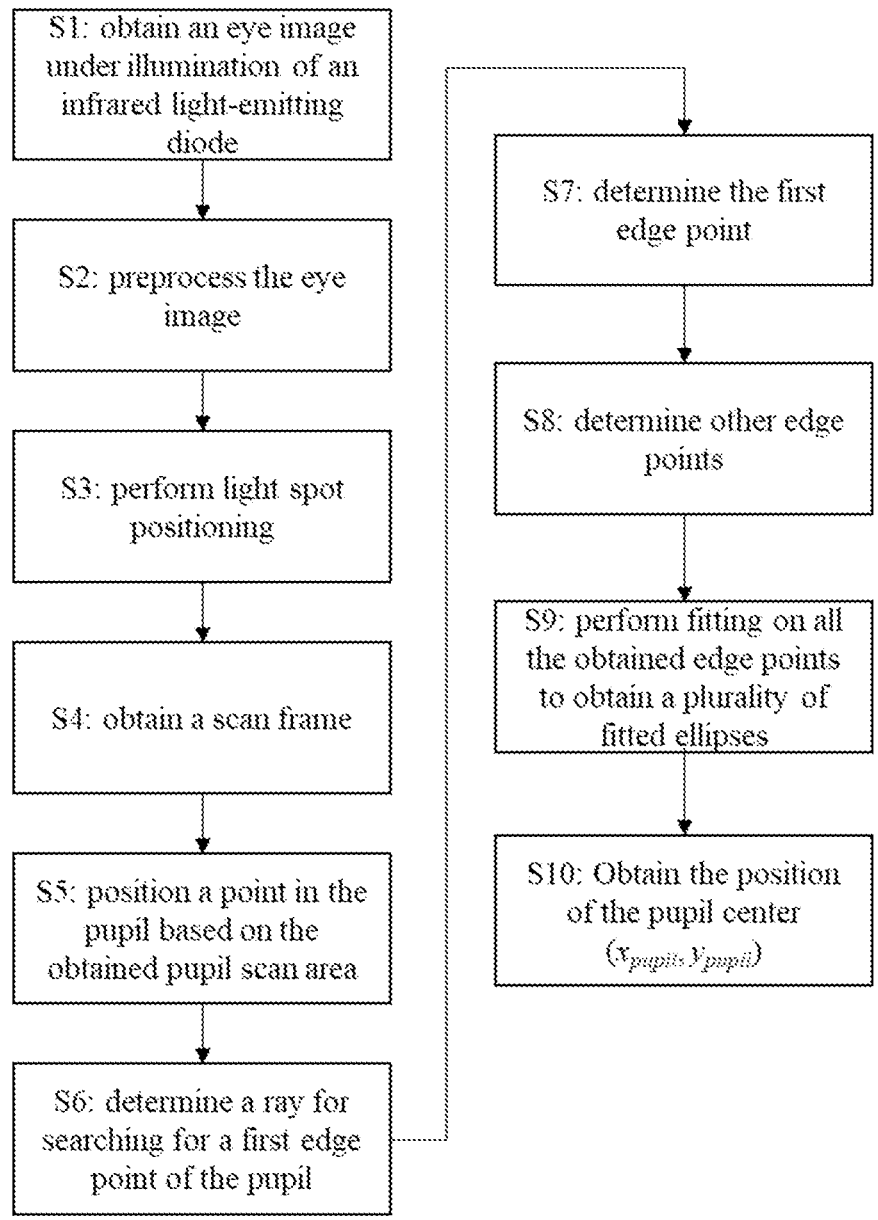
FIG. 1 is a flow chart showing a pupil positioning method according to one embodiment of the present disclosure.

The present disclosure will be further described in detail with reference to the accompanying drawings. When referring to the figures, like structures and elements shown throughout are indicated with like reference numerals. Obviously, the described embodiments are only a part of the embodiments of the present disclosure, not all of the embodiments. All other embodiments obtained by a person of ordinary skill in the art based on the embodiments of the present disclosure without creative efforts are within the protection scope of the present disclosure. In the description of the following embodiments, specific features, structures, materials or characteristics may be combined in any suitable manner in any one or more embodiments or examples.

In the following description, numerous specific details are set forth in order to provide a thorough understanding of the present disclosure, but the present disclosure may also be implemented in other ways other than those described herein. Therefore, the scope of the disclosure is not limited by the specific embodiments disclosed below.

The process of pupil positioning in the related art is susceptible to uneven illumination, reflective spots formed by an infrared LED in the cornea, eyebrow occlusion, and other factors. In the existing methods based on Hough transform, template matching, single ellipse fitting, etc., when the eyeball deflection angle is large (the shape deformation of pupil is large), the accuracy of pupil positioning is low.

One embodiment of the present disclosure provides a pupil positioning method. The pupil positioning method includes: obtaining an eye image under illumination of a light source; obtaining a first internal point in a pupil of the eye image; calculating gradient changes of pixel points along a straight line from the first internal point towards outside of the pupil; obtaining a first edge point at the edge of the pupil based on the gradient change (for example, determining a pixel point whose gradient change satisfies a preset condition as a first edge point); searching for a plurality of pixel points in the image having the same or similar gradient change as the gradient change of the first edge point, and setting the plurality of pixel points as the second edge point to the Nth edge point; performing ellipse fitting on the edge points from the first edge point to the Nth edge point to obtain a pupil center.

It should be understood that "having the same or similar gradient change" in one embodiment may mean that the difference between the gradient change at the pixel point and the gradient change at the first edge point is less than a predetermined threshold. The similar gradient change may mean that the gradient change at the pixel point and the gradient change at the first edge point may not be exactly the same, but their difference is less than the predetermined threshold. The predetermined threshold can be determined based on the specific resolution and recognition accuracy. In one embodiment, the pupil center is obtained by performing ellipse fitting. In the ellipse fitting algorithm commonly used in the art, at least 5 points are usually required for fitting. Hence, in some embodiments, N may be a positive integer greater than 4. However, it should be understood that the present disclosure is not limited thereto, and other numbers of edge points may be selected for different fitting algorithms.

In one embodiment, obtaining the first internal point in the pupil of the eye image includes: obtaining imaging points of the light source on the cornea, and calculating an average centroid position of all imaging points in the image; obtaining a pupil scan area based on the average centroid position; scanning the image in the pupil scan area using the pupil scan frame; determining the center of the pupil scan frame having the smallest average gray value as the first internal point.

In one embodiment, the pupil scan frame has a side length of d/4 and a scan step size of d/2, where the value of d includes one of the following values: 1/16 of the width of the eye image, or the length of the long axis of the pupil ellipse calculated in the image based on the previous frame. It should be understood that the embodiments of the present disclosure are not limited thereto, and the side length and scan step of the pupil scan frame may be appropriately selected based on specific accuracy requirements. It should also be understood that the side length of the pupil scan frame should be smaller than the side length of the pupil scan area due to the need to scan within the pupil scan area.

In one embodiment, the gradient change represents a change of a pixel gray value. Obtaining the first edge point at the edge of the pupil based on the preset condition includes: when the gradient change of the point is not less than a preset edge gradient, setting the point as the first edge point. That is, the preset condition may be that the gradient change of one point is not less than a preset edge gradient. The preset edge gradient is obtained by using the empirical values based on gradient of the pupil edge in the image acquired in advance.

In one embodiment, searching for the pixel points in the image that satisfy the gradient change includes: taking the first edge point as a starting point, searching along a predetermined direction in neighboring pixel points (e.g., 4 neighborhood pixels, 8 neighboring pixel or the like) for a point having the same or similar gradient change as the gradient change of the first edge point and setting it as the second edge point; taking the second edge point as a starting point, and searching along the predetermined direction in the neighborhood pixel points for a point that has the same or similar gradient change as the gradient change of the first edge point and setting it as the third edge point; repeating the above steps until the Nth edge point is obtained.

In one embodiment, performing ellipse fitting on the edge points from the first edge point to the Nth edge point includes: dividing the edge points from the first edge point to the Nth edge point into a plurality of consecutive groups; performing ellipse fitting respectively on the edge points in each group to obtain a plurality of ellipses; obtaining intersection points of the plurality of ellipses; and obtaining the pupil center using the intersection points.

In one embodiment, each of the plurality of groups includes the same number of edge points.

In one embodiment, dividing the edge points from the first edge point to the Nth edge point into a plurality of consecutive groups includes: dividing the edge points from the first edge point to the Nth edge point into four groups in horizontal and vertical directions; or dividing the edge points from the first edge point to the Nth edge point into four groups along the rotation direction of the ellipse (for example, clockwise or counterclockwise).

In one embodiment, obtaining the pupil center using the intersection points includes: obtaining average values of the coordinates of the plurality of intersection points, and using the average values of the coordinates of the plurality of intersection points as the coordinates of the pupil center.

Hereinafter, a pupil positioning method in one embodiment will be described in more detail with reference to FIG. 1. It should be understood that the steps of the method illustrated in FIG. 1 should not be construed as limiting the disclosure, and one or more steps may be added or reduced, or one step may be omitted without departing from the scope of the present disclosure, or one step may be split into several steps, or multiple steps may be combined into one step, or one or more steps may be performed in an order other than the order shown in FIG. 1.

Referring to FIG. 1, in one embodiment, a pupil positioning method may include the following steps:

Step S1, obtaining an eye image under illumination of an infrared light-emitting diode (LED) lamp when the user uses an apparatus. The wavelength of the infrared light from the infrared LED lamp may be about 850 nm. In one embodiment, the eye image can be captured by, for example, an infrared digital camera, and the captured digital image is transmitted to a processing device (for example, a processor) through a transmission interface to perform pupil positioning processing. It should be understood that obtaining an eye image under illumination of an infrared LED lamp (for example, under 850 nm infrared light) helps to separate the iris and the pupil clearly, thereby reducing the computation amount of the pupil positioning and improving the positioning accuracy. Since the infrared light is not visible to human eyes, it is beneficial to avoid light pollution. However, the present disclosure is not limited thereto, and an eye image may be acquired using other light sources.

Step S2, preprocessing the eye image including, for example, gray value conversion, histogram equalization, and Gaussian filtering. Preprocessing the acquired eye image is beneficial to eliminate noise in the image and improve the efficiency of subsequent processing. Specific image preprocessing methods and their effects are well known to those skilled in the art and therefore will not be described herein. It should be understood that the image preprocessing of the present disclosure is not limited to the preprocessing listed above, and other image preprocessing methods commonly used by those skilled in the art should also be construed as being included in the scope of the present disclosure.

Step S3, performing light spot positioning. In one embodiment, the reflected light spots formed by the reflection of infrared LED light source in the cornea of the human eye are used to obtain the average centroid position of all the light spots in the eye image.

Figure 2:
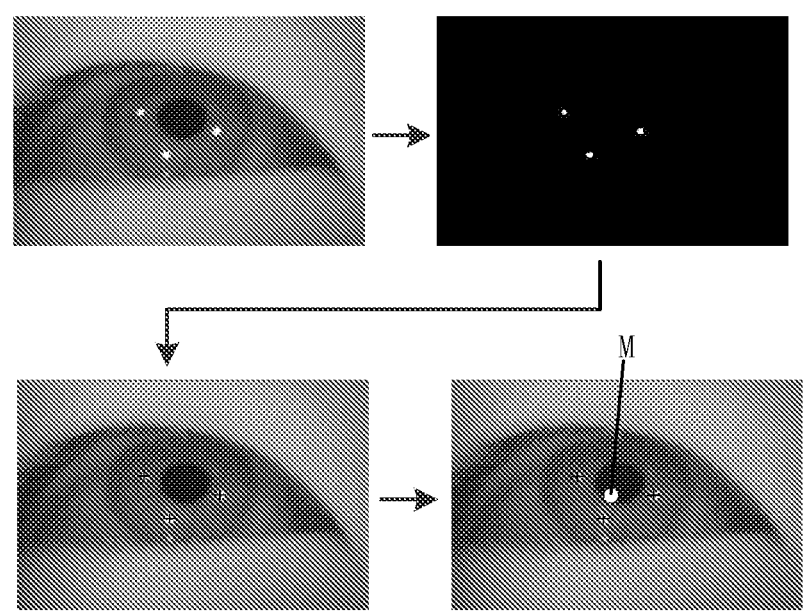
FIG. 2 is a schematic diagram showing a process of determining a centroid of light spots according to one embodiment of the present disclosure.

In one embodiment, as shown in FIG. 2, since the reflected light spots formed by the reflection of the infrared light source in the cornea of the human eye are very bright, the image is binarized based on an empirical threshold to separate out the light spots. Then, the edge detection is performed to detect the edge points of the light spots. If the detected ith light spot has n edge points $(x_i^j, y_i^j)$, where $j \in (0, n]$, then the centroid of the light spot is taken as the spot center $(x_i, y_i)$, and is calculated as follows:

$$x_i = \frac{\sum x_i^j}{n}$$

$$y_i = \frac{\sum y_i^j}{n}$$

Next, the average centroid position of all the light spots (as indicated by M in the last picture in FIG. 2) is calculated as follows:

$$x = \frac{\sum x_i}{n}$$

$$y = \frac{\sum y_i}{n}$$

where x and y represent the horizontal and vertical coordinate values respectively, i represents the ith light spot, and j represents the jth edge point of the light spot.

Step S4, obtaining a scan frame. In one embodiment, the pupil scan area is determined based on the calculated average centroid position of all the light spots.

Figure 3:
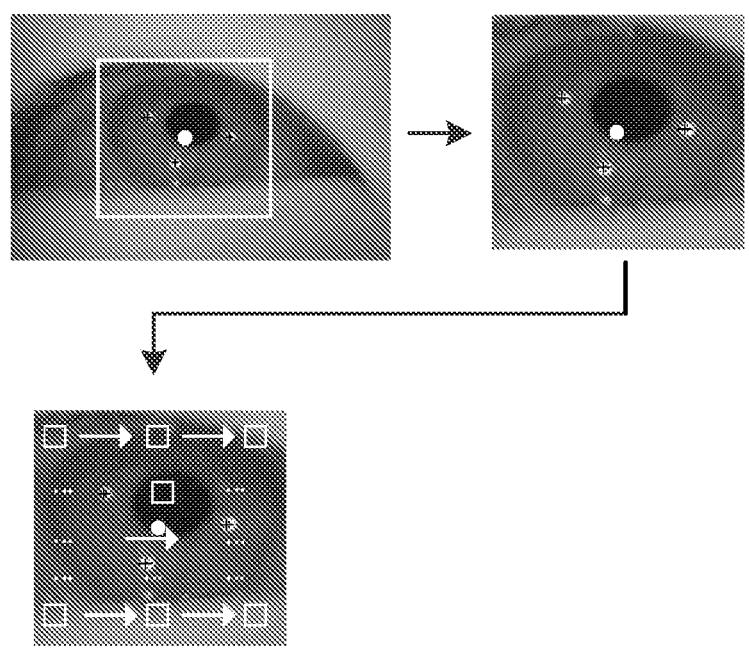
FIG. 3 is a schematic diagram showing a process of determining a first internal point according to one embodiment of the present disclosure.

In one embodiment, referring to FIG. 3, using the average centroid position of all the light spots calculated as the center of the scanning frame, a square area having a side length of 4×d is obtained as a pupil scan area. In one embodiment, the initial value of d is 1/16 of the current image width, and the value of the subsequent d is updated according to the length of the long axis of the pupil ellipse calculated in the previous frame of the image. However, the present disclosure is not limited thereto, and the size of the scan frame may be obtained based on the actual conditions.

Step S5, positioning a point in the pupil based on the obtained pupil scan area. In one embodiment, scanning is performed in the obtained pupil scan area to obtain a first internal point in the eye image located in the pupil.

In one embodiment, referring to the last picture of FIG. 3, a square sliding window having a side length of d/4 and a step size of d/2 is used to scan in the scan frame, and the average gray value of the image covered by each sliding window is calculated. Because the gray value of the pupil area is the smallest in the image, the position of the sliding window whose average gray value is found to be the smallest is located in the pupil. Further, the center O(x, y) of the sliding window having the smallest average gray value is used to obtain a point in the pupil, that is, the first internal point.

Step S6, determining a ray for searching for a first edge point of the pupil. In one embodiment, the first internal point is the origin from which a ray extends in the eye image, and gradient changes on the ray are calculated.

Figure 4:
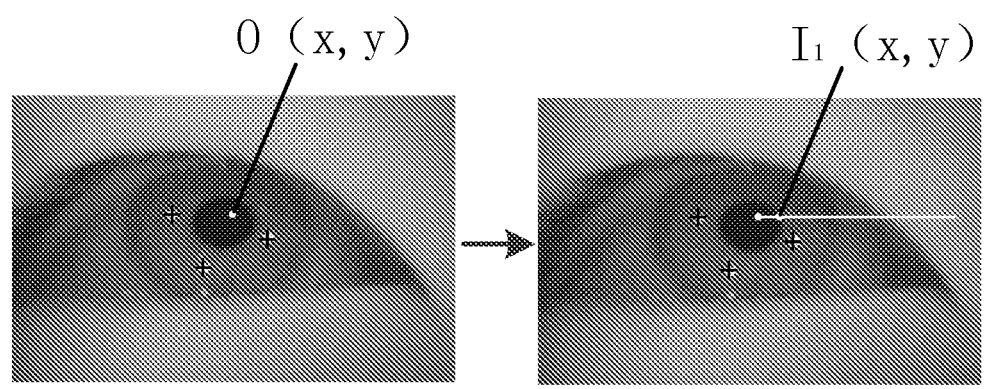
FIG. 4 is a schematic diagram showing a process of determining a first edge point according to one embodiment of the present disclosure.

In one embodiment, referring to FIG. 4, a point O(x, y) obtained in the pupil is the origin point, and a ray extends horizontally to the right in the image (the ray may also extend in any other direction). The gradient change of each pixel point in the ray direction is calculated. The gradient change indicates the change of the gray values of the pixels. When there is a pupil edge in the image, there should be a large gradient change value. Conversely, when there is a relatively smooth part in the image, there is a small change in the gray value and the corresponding gradient change is also small. The gradient change is calculated as follows:

$$G(x,y)=dx(i,j)+dy(i,j)$$

$$dx(i,j)=I(i+1,j)-I(i,j)$$

$$dy(i,j)=I(i,j+1)-I(i,j)$$

where I is the gray value of the image pixel, (i, j), (i+1, j), (i, j+1) are the coordinates of the adjacent pixels, dx(i, j) is the gradient change of the corresponding pixel in the horizontal direction, dy(i, j) is the gradient change of the corresponding pixel in the vertical direction, and G(x, y) is the gradient change of the corresponding pixel as a whole (vertical and horizontal directions).

Step S7, determining the first edge point. After obtaining the gradient changes of the points on the ray by step S6, the gradient change at each pixel point in the ray direction is compared with a preset edge gradient threshold, $G_{threshold}$. The position of the first edge point is obtained based on the comparison result. When $G(x, y) \geq G_{threshold}$, the pixel point $I_1(x, y)$ is determined as the initial edge point of the pupil (i.e., the first edge point).

In one embodiment, the threshold value $G_{threshold}$ is obtained by using the empirical value based on gradient change of the pupil edge in the image acquired in advance. The calculation of the empirical value may refer to step S6, but is not limited thereto, and may also be known according to those skilled in the art or any other methods to determine the edge gradient threshold.

Step S8, determining other edge points. In one embodiment, a search is performed in a predetermined direction starting from the first edge point to obtain other edge points in the eye image.

In one embodiment, the obtained first edge point $I_1(x, y)$ is taken as a starting point, and a point $I_2(x, y)$ that satisfy the gradient change condition (for example, the gradient change is the same as or similar to the gradient change of the first edge point) is searched in the neighboring pixel points along the clockwise direction following the order of left-to-right and top-to-bottom. Next, search for other edge points in the 8 neighborhood pixel points starting from $I_2(x, y)$, and after continuous iteration, obtain all N pupil edge points $I_i(x, y)$, where N is a positive integer greater than 4, i is the number of pupil edge points and i is not greater than N.

Step S9, performing fitting on all the obtained edge points to obtain a plurality of fitted ellipses.

Figure 5:
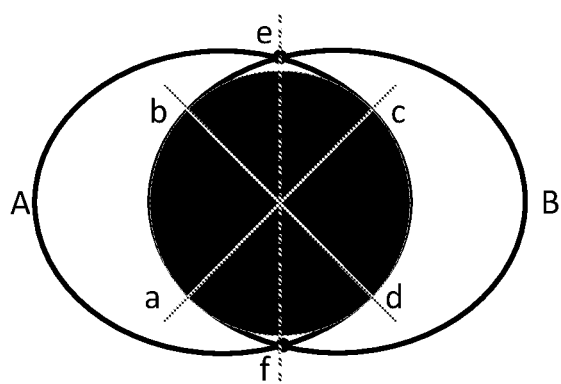
FIGS. 5A and 5B are schematic views showing a process of determining a pupil center according to one embodiment of the present disclosure.
Figure 5B:
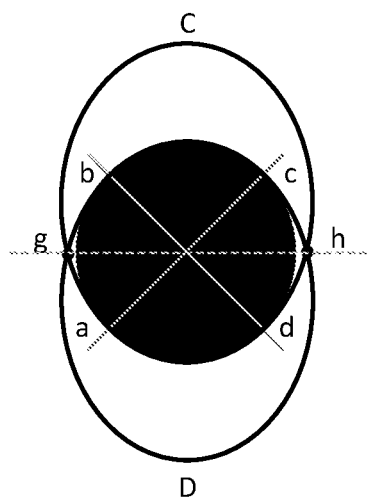

In one embodiment, referring to FIG. 5A and FIG. 5B, all pupil edge points are equally divided into four groups in the horizontal direction and the vertical direction (may also be in the elliptical rotation direction), and the ellipse fitting is performed on edge points of each of the groups respectively. For example, as shown in FIG. 5A, $\overline{ab}$ and $\overline{cd}$ are selected, and the fitting is performed on the edge points of $\overline{ab}$ and $\overline{cd}$ to obtain ellipses A and B. By finding intersection points of ellipses A and B, $e(x_e, y_e)$ and $f(x_f, y_f)$ are obtained. As shown in FIG. 5B, $\overline{bc}$ and $\overline{ad}$ are selected, and the fitting is performed on the edge points on $\overline{bc}$ and $\overline{ad}$ to obtain the ellipses C and D. By finding the intersection points of the ellipses C and D, $g(x_g, y_g)$ and $h(x_h, y_h)$ are obtained.

In one embodiment, all pupil edge points are equally divided into four consecutive groups, so that four groups containing the same number of edge points can be obtained. However, it should be understood that it is not limited to four groups, and may be divided into other number of groups based on the number of specific edge points and the calculation requirements. In addition, since the number of all edge points is usually not necessarily an integer multiple of the number of groups, the "average" groupings and the number "identical" referred to in some embodiments may mean substantially evenly distributed or the same amount within a certain margin of error. For example, the number of edge points included in each group may be identical or may differ from each other by about 1% to about 20% of the number of edge points.

In step S10, the position of the pupil center $(x_{pupil}, y_{pupil})$ is obtained based on the intersection points of the plurality of ellipses, and the calculation is as follows:

$$x_{pupil} = \frac{x_g + x_h}{2}$$
$$y_{pupil} = \frac{y_e + y_f}{2}$$

where x and y represent coordinate values, and e, f, g, and h represent the intersection points of the ellipses, respectively.

The pupil positioning method according to some embodiment of the present disclosure has been described in detail above with reference to FIG. 1 to FIG. 5B. However, it should be understood that the above-described drawings and any detailed features referred to in the detailed description should not be construed as limiting the present disclosure, but merely to enable those skilled in the art to clearly understand the specific examples of the present disclosure.

Figure 6:
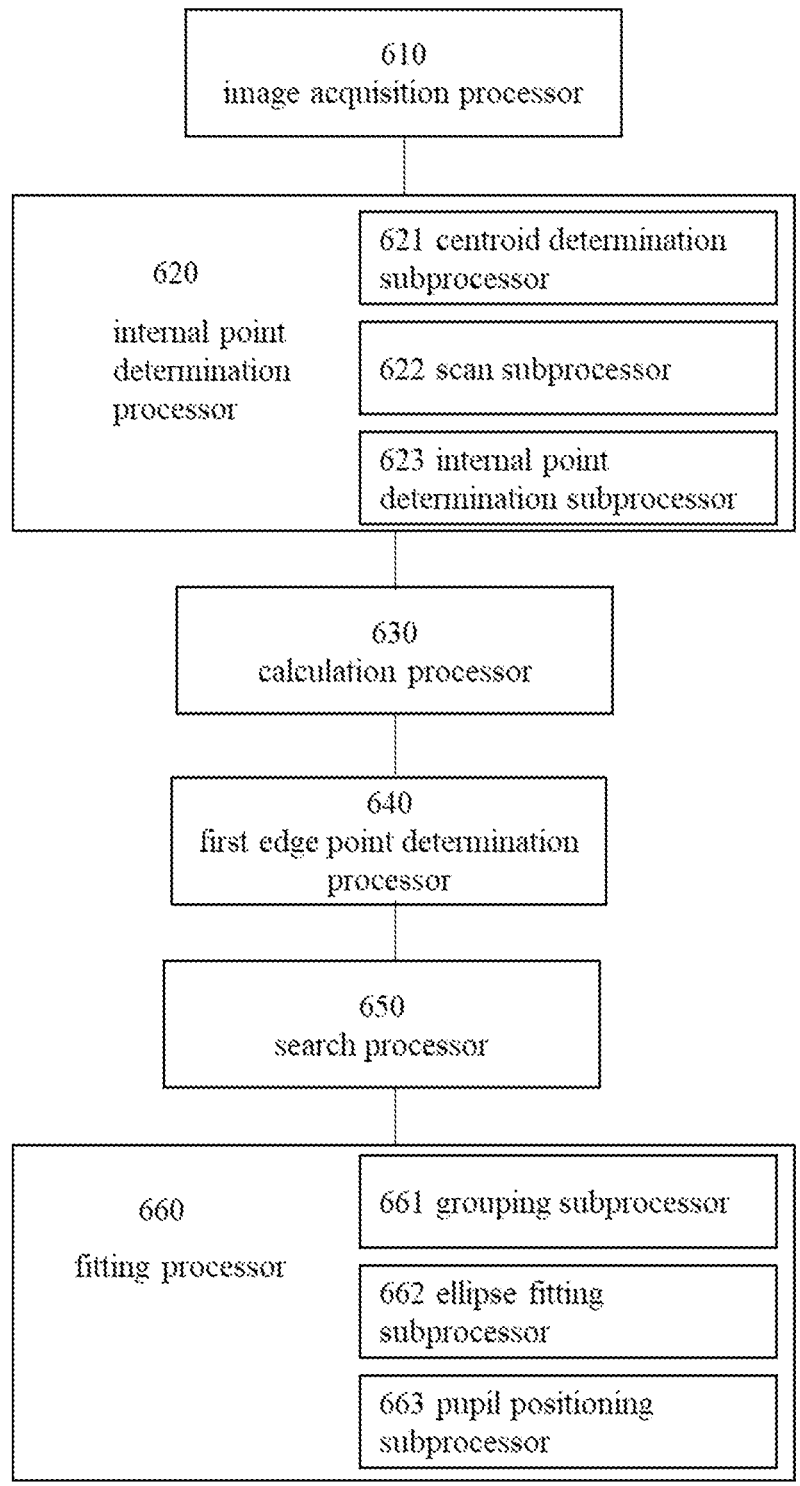
FIG. 6 is a block diagram of a pupil positioning apparatus according to one embodiment of the present disclosure.

Another embodiment of the present disclosure provides a pupil positioning apparatus. Referring to FIG. 6, the pupil positioning apparatus may include: an image acquisition processor 610, configured to acquire an eye image under illumination of a light source; an internal point determination processor 620, configured to obtain a first internal point located in the pupil of the eye image; an calculation processor 630, configured to calculate gradient changes of the pixel points on a straight line from the first point towards outside of the pupil; an first edge point determination processor 640, configured to determine the first position on the edge of the pupil based on the gradient change of the edge points; a search processor 650, configured to search for pixel points in the image that satisfies the gradient change condition, and determine the edge points from the second edge point to an Nth edge point; and a fitting processor 660, configured to perform ellipse fitting on edge points from the first edge point to the Nth edge point to obtain the pupil center, where N is a positive integer greater than four.

It should be understood that a unit or subunit, or a combination thereof, in accordance with an embodiment of the present disclosure may be implemented by a combination of correspondingly configured hardware modules, software modules, and/or software hardware modules. For example, the image acquisition processor 610 may include hardware modules, such as digital video cameras and/or corresponding digital processing circuits, and may also include software modules, such as a software algorithm stored in a computer readable medium and executed in a processor, configured to acquire and process digital image signals from an external digital camera. It should be understood that the above embodiments are merely an example. For example, the image acquisition processor 610 may also include a unit that receives an analog digital image and performs A/D or D/A conversion. In one embodiment, the internal point determination processor 620, the calculation processor 630, the first edge point determination processor 640, the search processor 650, the fitting processor 660 may be a general purpose processor, a digital signal processor (DSP), an application specific integrated circuit (ASIC), an off-the-shelf programmable gate array (FPGA) or combinations of programmable logic devices, discrete gates or transistor logic devices, discrete hardware components, and the like. Other processors and/or sub-processors of the present disclosure may be configured in a similar manner, and will not be further repeated herein for the sake of brevity.

In addition, in one embodiment, the internal point determination processor 620 may include: a centroid determination subprocessor 621, configured to obtain imaging points of the light source on a cornea, and calculate an average centroid position of all the imaging points in the image; a scan subprocessor 622, configured to scan the image using the pupil scan frame obtained based on the average centroid position; and an internal point determination subprocessor 623, configured to obtain the first internal point using the center of the pupil scan frame having the smallest average gray value. In one embodiment, the centroid determination subprocessor 621, the scan subprocessor 622, and the internal point determination subprocessor 623 may be a general purpose processor, a digital signal processor (DSP), an application specific integrated circuit (ASIC), an off-the-shelf programmable gate array (FPGA) or combinations of programmable logic devices, discrete gates or transistor logic devices, discrete hardware components, and the like.

In one embodiment, the fitting processor 660 may include a grouping subprocessor 661 configured to divide the edge points from the first edge point to the Nth edge point into a plurality of consecutive groups; an ellipse fitting subprocessor 662, configured to perform elliptical fitting on the edge points of each group to obtain a plurality of ellipses; and a pupil positioning subprocessor 663, configured to obtain intersection points of the plurality of ellipses and obtain a pupil center using the intersection points. In one embodiment, the grouping subprocessor 661, the ellipse fitting subprocessor 662, and the pupil positioning subprocessor 663 may be a general purpose processor, a digital signal processor (DSP), an application specific integrated circuit (ASIC), an off-the-shelf programmable gate array (FPGA) or combinations of programmable logic devices, discrete gates or transistor logic devices, discrete hardware components, and the like.

It should be noted that the pupil positioning apparatus in some embodiments includes several units/subunits shown in the drawings, but the present disclosure is not limited thereto, and the above unit/subunit may be further divided into a plurality of unit modules in order to perform the corresponding operations independently or collectively. The above-described plurality of units/subunits may be integrated into one unit module and/or composed of an IC (integrated circuit), and the present disclosure does not specifically limit the composition of the above unit/subunit.

Figure 7:
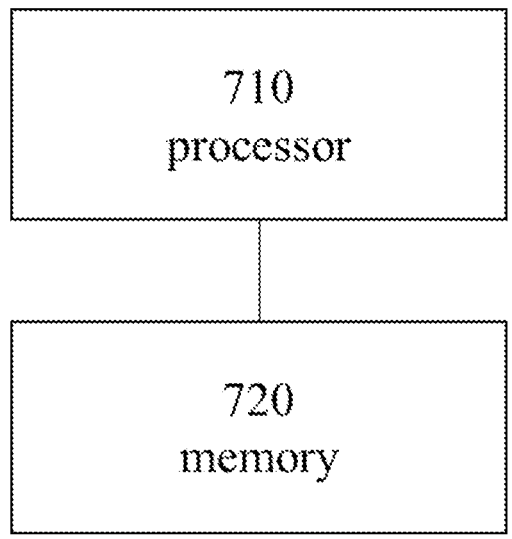
FIG. 7 is a block diagram of a pupil positioning apparatus according to one embodiment of the present disclosure.

In one embodiment, referring to FIG. 7, a pupil positioning apparatus includes: a processor 710; and a memory 720 storing computer readable instructions, wherein when the processor 710 is executing the computer readable instructions, the pupil positioning apparatus performs the pupil positioning method according to some embodiments of the present disclosure.

It should be understood that, in some embodiments, the processor 710 may be a central processing unit (CPU), and the processor 710 may also be other general purpose processors, digital signal processors (DSPs), an application specific integrated circuit (ASIC), an off-the-shelf programmable gate array (FPGA) or other programmable logic device, discrete gate or transistor logic device, discrete hardware component, and the like. The general purpose processor may be a microprocessor or the processor or any conventional processor or the like.

The memory 720 can include read only memory and random access memory and provides instructions and data to the processor 710. A portion of the memory 720 may also include a non-volatile random access memory. For example, the memory 720 may also store information of the device type.

Figure 8:
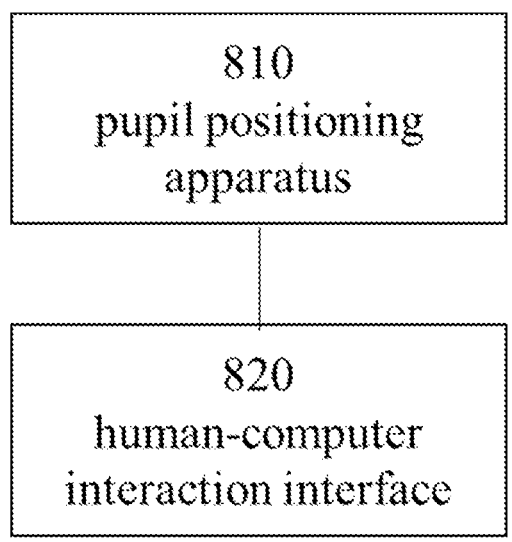
FIG. 8 is a schematic diagram of a VR/AR apparatus according to one embodiment of the present disclosure.

In the implementation, each step of the above method may be completed by an integrated logic circuit of hardware in the processor 710 or an instruction in a form of software. The steps of the method disclosed in the embodiments of the present invention may be directly implemented as a hardware processor, or may be performed by a combination of hardware and software modules in the processor. The software module can be located in a conventional storage medium such as random access memory, flash memory, read only memory, programmable read only memory or electrically erasable programmable memory, registers, and the like. The storage medium is located in the memory 720, and the processor 710 reads the information in the memory 720 and, in conjunction with its hardware, performs the steps of the above method. The detail will not be repeated herein According to another embodiment of the present disclosure, referring to FIG. 8, a VR/AR apparatus includes: a pupil positioning apparatus 810 according to some embodiments of the present disclosure; and a human-machine interaction interface 820, configured to conduct human-computer interaction by obtaining the pupil center using the pupil positioning apparatus 810.

According to some embodiments of the present disclosure, the VR/AR apparatus may be a device for implementing virtual reality and/or augmented reality. Virtual reality (VR) is a high-tech device that has emerged in recent years, also known as spiritual technology or artificial environment. Virtual reality uses computer simulation to generate a virtual world in a three-dimensional space, providing users with simulations of visual, auditory, tactile and other senses, and allowing users to observe things in the three-dimensional space in a timely and unrestricted manner. Augmented reality (AR) applies virtual information to the real world through computer technology. The real environment and virtual objects are superimposed on the same picture or space in real time. A VR/AR device typically has at least one human-computer interaction interface to enable interaction between the user and the device. In one embodiment, the human-computer interaction interface 820 performs human-computer interaction using the pupil center obtained by the pupil positioning apparatus 810, so that the user can perform human-computer interaction through operations such as rotation of the eyeball, gaze, and the like.

In another embodiment of the present disclosure, a computer readable medium stores computer readable code for a computer to perform a pupil positioning method according to some embodiments of the present disclosure.

Figure 9:
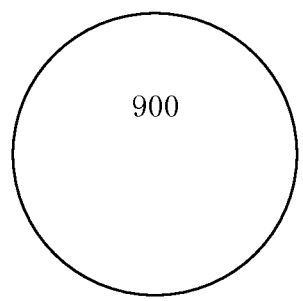
FIG. 9 is a schematic diagram of a computer readable medium according to one embodiment of the present disclosure.

In one embodiment, the computer readable code may be implemented in the form of a software functional unit and sold or used as a standalone product, and may be stored in a computer readable storage medium 900, as shown in FIG. 9. Based on such understanding, the technical solution of the present disclosure, which is essential or contributes to the prior art, or a part of the technical solution, may be embodied in the form of a software product, which is stored in a storage medium, including the instructions are used for a computer device (which may be a personal computer, smart terminal, server, or network device, etc.) to perform all or part of the steps of the methods described in various embodiments of the present disclosure. The storage medium includes: a U disk, a mobile hard disk, a read only memory (ROM), a random access memory (RAM), a magnetic disk, or an optical disk, and the like, which can store program codes.

According to some embodiments of the present disclosure, a pupil positioning method and apparatus, a VR/AR apparatus, and a computer readable medium may obtain an eye image under illumination of a light source; obtain a first internal point located in the pupil of the eye image; calculate gradient change of pixel points on a straight line starting from the first internal point towards outside of the pupil; obtain a first edge point on the edge of the pupil based on the gradient change; search for pixel points in the image that satisfy the gradient change condition, and obtain edge points from the second edge point to an Nth edge point; perform ellipse fitting on the edges points from the first edge point to the Nth edge point to obtain a pupil center. In some embodiments of the present disclosure, the edge points of the pupil are obtained based on the gradient changes of the pixel points, and multiple ellipse fitting is performed based on the edge points to obtain the pupil center. As such, the pupil positioning method and apparatus, the VR/AR apparatus, and the computer readable medium can perform robust positioning with high accuracy, which can be used for VR, AR or other pupil positioning or eyeball tracking system based on line of sight interaction.

Unless otherwise defined, technical terms or scientific terms used in the present disclosure are intended to be in the ordinary meaning of those of ordinary skill in the art. The words "first," "second" and similar words used in the present disclosure do not denote any order, quantity or importance, but are merely used to distinguish different components. The words "including" or "comprising" and the like mean that the element or the item preceding the word includes the element or item listed after the word and its equivalent and do not exclude other components or objects. "Coupled" and the like are not limited to physical or mechanical connections, but may include electrical connections, whether direct or indirect. "Upper," "lower," "left," "right," etc. are only used to indicate the relative positional relationship. When the absolute position of the object being described is changed, the relative positional relationship may also change accordingly.

In the description of the following embodiments, specific features, structures, materials or characteristics may be combined in any suitable manner in any one or more embodiments or examples.

What is claimed is:

1. A pupil positioning method, comprising:
   obtaining an eye image under illumination of a light source;
   determining a first internal point in a pupil of the eye image;
   calculating gradient changes of pixel points along a straight line starting from the first internal point toward outside of the pupil;
   determining a plurality of edge points at an edge of the pupil based on the gradient changes of the pixel points along the straight line; and
   performing ellipse fitting on the edge points to obtain a pupil center,
   wherein determining the first internal point in the pupil of the eye image comprises:
   obtaining imaging points of the light source on a cornea and calculating an average centroid position of all the imaging points in the eye image;
   obtaining a pupil scan area based on the average centroid position;
   scanning the eye image in the pupil scan area using a pupil scan frame having a predetermined side length according to a predetermined scan step size; and
   determining a center of the pupil scan frame having a smallest average gray value as the first internal point.

2. The pupil positioning method according to claim 1, wherein the pupil scan frame has a side length of d/4 and a scan step size of d/2, a value of d is ¹⁄₁₆ of a width of the eye image or a length of a long axis of a pupil ellipse calculated based on a previous frame of the eye image.

3. The pupil positioning method according to claim 1, wherein determining the plurality of edge points at the edge of the pupil based on the gradient changes of the pixel points along the straight line comprises:
   determining a pixel point, among the pixel points along the straight line, having a gradient change that satisfies a preset condition as a first edge point at the edge of the pupil;
   searching for a plurality of pixel points in the image having the same or similar gradient change as the gradient change at the first edge point, and
   setting the plurality of pixel points as the second edge point to the Nth edge point, where N is a positive integer greater than 4.

4. The pupil positioning method according to claim 3, wherein the gradient change is a change in a pixel gray value, and the preset condition is that the change in the pixel gray value at the pixel point is not less than a preset edge gradient.

5. The pupil positioning method according to claim 3, wherein searching for the plurality of pixel points in the image having the same or similar gradient change as the gradient change at the first edge point comprises:
   searching, starting from the first edge point, in neighborhood pixels along a predetermined direction for a first point that a difference between a gradient change at the first point and the gradient change at the first edge point is less than a predetermined threshold, and setting the first point as the second edge point;
   searching, starting from the second edge point, in neighborhood pixels along the predetermined direction for a second point that a difference between a gradient change at the second point and the gradient change at the first edge point is less than the predetermined threshold, and setting the second point as the third edge point; and
   repeating the above steps until the Nth edge point is obtained.

6. The pupil positioning method according to claim 5, wherein performing ellipse fitting on the edge points comprises:
   dividing the edge points from the first edge point to the Nth edge point into a plurality of consecutive groups;
   performing ellipse fitting on the edge points in each of the consecutive groups separately to obtain a plurality of ellipses;
   obtaining intersection points of the plurality of ellipses; and
   obtaining the pupil center based on the intersection points.

7. The pupil positioning method according to claim 6 wherein each of the plurality of consecutive groups comprises a substantially same number of edge points.

8. The pupil positioning method according to claim 6, wherein dividing the edge points from the first edge point to the Nth edge point into the plurality of consecutive groups comprises:
   dividing the edge points from the first edge point to the Nth edge point into four groups in horizontal and vertical directions; or dividing the edge points from the first edge point to the Nth edge point into four groups in a clockwise or counterclockwise direction.

9. The pupil positioning method according to claim 6, wherein obtaining the pupil center based on the intersection points comprises:
   using average values of coordinates of the intersection points as position coordinates of the pupil center.

10. The pupil positioning method according to claim 1, wherein the light source is an infrared light-emitting diode (LED) lamp and a wavelength of an infrared light from the infrared LED lamp is about 850 nm.

11. The pupil positioning method according to claim 1, wherein the eye image is captured by an infrared camera.

12. The pupil positioning method according to claim 1, before determining the first internal point in the pupil of the eye image, further comprising preprocessing the eye image including gray value conversion, histogram equalization, and Gaussian filtering.

13. A pupil positioning apparatus, comprising:
an image acquisition processor configured to obtain an eye image under illumination of a light source;
an internal point determination processor, configured to obtain a first internal point in a pupil of the eye image;
a calculation processor, configured to calculate gradient changes of pixel points along a straight line starting from the first internal point toward outside of the pupil;
a first edge point determination processor, configured to determine a pixel point having a gradient change that satisfies a preset condition as a first edge point at an edge of the pupil;
a search processor, configured to search for a plurality of pixel points in the eye image having the same or similar gradient change as the gradient change at the first edge point, and set the plurality of pixel points as a second edge point to an Nth edge point, where N is a positive integer greater than 4; and
a fitting processor, configured to perform ellipse fitting on the edge points from the first edge point to the Nth edge point to obtain a pupil center,
wherein the internal point determination processor comprises:
a centroid determination subprocessor, configured to obtain imaging points of the light source on a cornea and calculate an average centroid position of all the imaging points in the eye image;
a scan subprocessor, configured to obtain a pupil scan area based on the average centroid position and scan the eye image in the pupil scan area using a pupil scan frame having a predetermined side length based on a predetermined scan step size; and
an internal point determination subprocessor, configured to determine a center of the pupil scan frame having a smallest average gray value as the first internal point.

14. The pupil positioning apparatus according to claim 13, wherein the fitting processor comprises:
a grouping subprocessor, configured to divide the edge points from the first edge point to the Nth edge point into consecutive groups;
an ellipse fitting subprocessor, configured to perform ellipse fitting on the edge points in each of the groups separately to obtain a plurality of ellipses;
a pupil positioning subprocessor, configured to obtain intersection points of the plurality of ellipses and obtain the pupil center using the intersection points.

15. A virtual reality/augmented reality apparatus, comprising the pupil positioning apparatus according to claim 13.

16. A non-transitory computer storage medium having stored thereon computer program instructions, wherein the pupil positioning method of claim 1 is implemented when the computer program instructions are executed by a processor.

17. A pupil positioning apparatus, comprising:
a display screen;
a processor; and
a non-transitory storage medium coupled to the processor and storing a computer program that, when executed by the processor, causes the processor to:
obtain an eye image under illumination of a light source;
determine a first internal point in a pupil of the eye image;
calculate gradient changes of pixel points along a straight line starting from the first internal point toward outside of the pupil;
determine a plurality of edge points at an edge of the pupil based on the gradient changes of the pixel points along the straight line; and
perform ellipse fitting on the edge points to obtain a pupil center,
wherein the computer program, when executed by the processor, causes the processor to determine the first internal point in the pupil of the eye image comprises causing the processor to:
obtain imaging points of the light source on a cornea and calculate an average centroid position of all the imaging points in the eye image;
obtain a pupil scan area based on the average centroid position;
scan the eye image in the pupil scan area using a pupil scan frame having a predetermined side length according to a predetermined scan step size; and
determine a center of the pupil scan frame having a smallest average gray value as the first internal point.

* * * * *